Nov. 30, 1943.   G. E. MILLARD   2,335,295
METHOD OF MANUFACTURING AND CASE HARDENING GEAR WHEELS
Filed Dec. 5, 1940
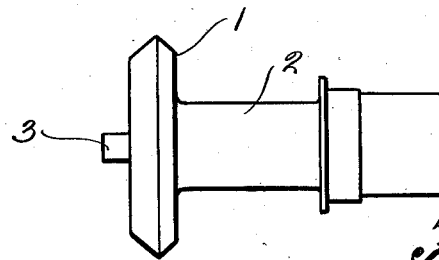
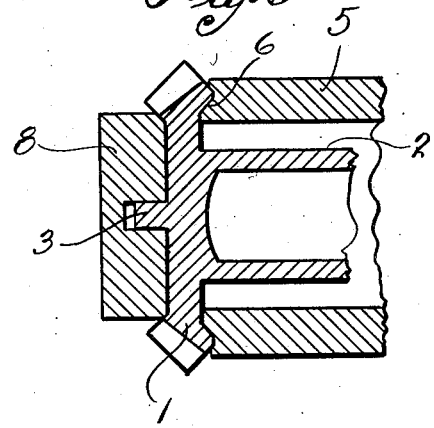
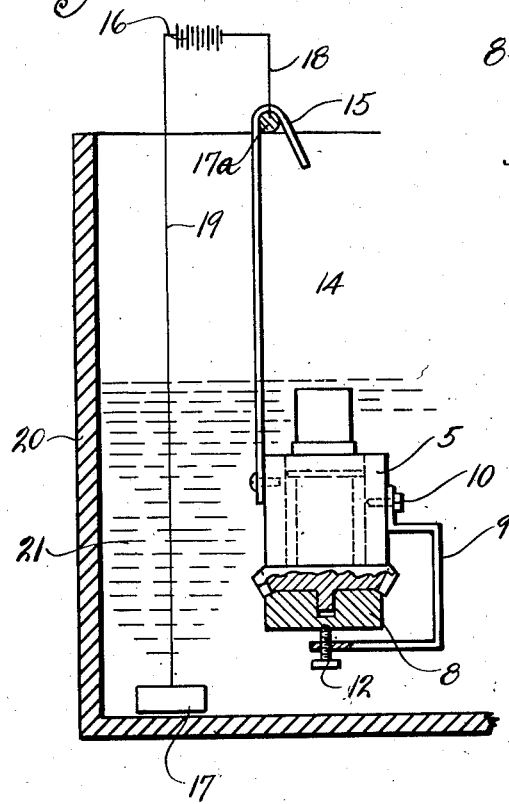
INVENTOR
GEORGE E. MILLARD
BY
Cook & Robinson
ATTORNEY Patented Nov. 30, 1943

2,335,295

UNITED STATES PATENT OFFICE 2,335,295

METHOD OF MANUFACTURING AND CASE HARDENING GEAR WHEELS

George E. Millard, Seattle, Wash.

Application December 5, 1940, Serial No. 368,682

2 Claims. (Cl. 204—16)

This invention relates to the manufacture of machine gears. More particularly, it relates to means utilized in the case hardening of steel gear wheels; in the steps of a method of case hardening, and in the particular sequence of steps employed in the method.

It is well recognized in the art to which this invention belongs, that machine gears, properly heat treated and case hardened, to increase their strength, durability and hardness of wearing surfaces, have many advantages over gears not so treated. Case hardening is now common practice, and certain methods are well known and in common use where the making and cutting of steel gears are concerned.

The case hardening of gear wheels, for various reasons, is generally confined to certain portions of the gears; for instance, to the teeth and closely adjacent portions, since the teeth are subjected to the greatest amount of wear, and also because it is generally desired that other portions of the gear be worked on by tools of various kind after the case hardening operation has been completed; for example, in the preparation of the gear for mounting on a shaft or for attachment to other parts. Therefore, it will be understood particularly by those familiar with the gear cutting art, that it is undesirable and impractical to harden those parts of a gear that must subsequently be finished or cut.

The general procedure in the manufacture of gears preparatory to case hardening, is to coat the entire gear surface with copper, since a surface while so coated is not subject to case hardening by the usual heat treatment; then to place the gear blank in a machine and true up those copper coated portions whereby the gear blank is to be mounted in the gear cutting machine so that the cutting will be accurately done; and, finally, to place the prepared gear blank in the gear cutting machine and cut the teeth therein. The tooth cutting operation incidentally removes the copper from those particular surfaces that are to be case hardened, but leaves those parts that are not to be hardened, protectively covered with the copper plating.

This generally followed method has certain disadvantages; for example, there is a waste of copper in the coating of the entire blank; there is extra work required in the truing up of the copper coated mounting portions of the blank preparatory to fixing it in the gear cutting machine, and furthermore, there is an unnecessary loss of time in the preparatory coating and truing operations.

In view of the foregoing disadvantages, and for various other reasons, it has been the principal object of the present invention to provide a novel means for use in the manufacture of machine gears, and a novel method which simplifies the manufacture and lessens the expense that is usually incident to the case hardening operation.

Other objects of the present invention reside in the novel form of jig that is provided for use in the manufacture of gears, and in the particular sequence of steps of the novel method followed in the case hardening of certain designated portions of gears whereby the manufacture is simplified, and the expense of case hardening is materially reduced.

In carrying out the above objects of the invention, I have provided the improved details of construction of a special form of jig, the preferred form of which is illustrated in the accompanying drawing, wherein—

Fig. 1 is a side view of one form of gear blank as prepared for the formation of a gear therefrom.

Fig. 2 is a sectional detail of a formed gear wheel, as applied to the present form of jig, and as suspended in a solution for removal, by electrolysis, of copper from parts that are to be case hardened.

Fig. 3 is a sectional detail showing the manner in which the inner and outer members of the jig are fitted to the gear.

Referring more in detail to the drawing—

1 designates what, for convenience in this description, will be referred to as the gear blank. This blank has here been illustrated as shaped for the cutting of a beveled gear wheel, but it is to be understood that the shape of the gear is of no particular consequence in the present invention, and that it might be a gear wheel of any other shape without requiring any change in the method and without in any way departing from the spirit of the invention. For convenience, in the mounting of the gear blank in the gear cutting machine, it might, as here shown, be provided with the hub portion 2 and shank 3 which extend from its opposite faces.

In the present method of manufacture, the gear blank is first properly mounted in the gear cutting machine, and the teeth are cut and finished therein. Then the gear wheel is removed from the gear cutting machine, and it is copper plated over its entire surface. This may be done by any of the well known, present-day methods. This differs from present-day practise of plating prior to cutting the teeth. Then, with the plating finished, the gear is applied to a jig, presently to be described in detail, which has for its purpose to cover up those surfaces of the gear that are not to be case hardened. With the gear wheel thus protected by the application of the parts of the jig thereto, it is then immersed in a suitable solution, for example, a chromic acid, and an electric current so applied that, by the well known action of electrolysis, the copper plating is removed from those surfaces of the gear that are exposed, or outside of the jig. Generally, the parts exposed are the teeth of the gear and parts closely adjacent thereto; it being understood that the exposed surfaces might be extended as desired.

Referring now to Figs. 2 and 3: The surface protecting jig as herein illustrated, comprises a collar or sleeve-like portion 5, adapted to closely fit about the gear hub 2, and is formed with an annular end flange or seat 6 adapted to tightly fit against the finished outer face of the gear up to the base of the teeth, or to extend to a greater or lesser extent as desired. Also, there is a disk or plate 8, adapted to fit tightly against the finished inside face of the gear up to the toothed portion or to a greater or lesser extent as desired. Thus, the parts 5 and 8 protectively overlie those parts of the gear on which it is desired that the copper coating shall remain to prevent these surfaces being case hardened when the gear is given the heat treatment for case hardening the toothed portion.

The parts 5 and 8 are held securely in place by means of a clamp bracket 9 which is fixed pivotally by a bolt 10 to the sleeve or collar, and at its other end mounts a threaded clamp screw, or the like, 12, adapted to be tightened against the disk 8, thus to hold the parts 5 and 8 sufficiently clamped in place that when immersed in the acid solution, there will be no leakage between the fitted surfaces.

Also, there is a metal handle member 14, fixed to the sleeve 5 and formed at its outer end with a hook 15 for convenience in suspending the parts from the anode terminal 17a of the electric circuit used in the process; the circuit being indicated in Fig. 2, wherein the source of electricity is designated at 16, the cathode terminal at 17, and the circuit connections by numerals 18 and 19. A treating vessel is designated at 20 and the acid solution at 21.

It will here by mentioned that the jig parts 5, 8 and 9 preferably are of aluminum, as this particular metal has its advantages when used in the particular solution.

Assuming that a gear blank, prior to any case hardening treatment, has had the teeth cut therein, and has then been copper plated, and has had the parts 5 and 8 of the protecting jig applied thereto as illustrated in Fig. 2, it is quite apparent then that when the parts are immersed in the acid, and connected in the electric circuit, as shown, an electrolytic action will be set up to effectively remove the copper from the exposed portions of the gear. By proper watching, the gear may be removed at the time when all the exposed copper has been removed, but before the steel has been acted on. In this connection, it will be stated that the particular acid herein mentioned is very desirable, since it does not readily have any material effect on steel.

With the copper then removed from the parts that are to be case hardened, the gear is given the usual case hardening heat treatment. After this has been finished, the copper may be removed from the remaining portions of the gear by sand blast or otherwise.

Having thus described my invention, what I claim as new therein and desire to secure by Letters Patent is—

1. The method of manufacturing machine gears with case hardened teeth, which comprises machining the gear blank to finish the gear and teeth; then electrolytically applying a copper plating to the entire surface of the finished gear; then applying fitted complemental shielding members over the finished gear and leaving the teeth unshielded; then electrolytically removing the copper plating from the unshielded teeth; then removing the shielding members from the gear; then subjecting the gear to case hardening treatment; and then finally removing the remaining copper plating from the gear.

2. The method of manufacturing machine gears with case hardened teeth, which comprises machining the gear blank to finish the gear and teeth; then electrolytically applying a copper plating to the entire surface of the finished gear; then applying fitted complemental shielding members over the finished gear and leaving the teeth unshielded; then electrolytically removing in a chromic acid bath the copper plating from the unshielded teeth; then removing the shielding members from the gear; then subjecting the gear to case hardening treatment; and then finally removing the remaining copper plating from the gear.

GEORGE E. MILLARD.